(12) United States Patent
Maren (10) Patent No.: US 7,389,282 B2
(45) Date of Patent: Jun. 17, 2008

(54) SYSTEM AND METHOD FOR PREDICTIVE ANALYSIS AND PREDICTIVE ANALYSIS MARKUP LANGUAGE

(75) Inventor: Alianna J. Maren, McLean, VA (US)

(73) Assignee: Viziant Corporation, McLean, VA (US)

( * ) Notice: Subject to any disclaimer, the term of this patent is extended or adjusted under 35 U.S.C. 154(b) by 296 days.

(21) Appl. No.: 11/264,748

(22) Filed: Nov. 2, 2005

(65) Prior Publication Data

US 2006/0167689 A1   Jul. 27, 2006

Related U.S. Application Data

(60) Provisional application No. 60/623,868, filed on Nov. 2, 2004.

(51) Int. Cl.
*G06N 5/00* (2006.01)
(52) U.S. Cl. .................................. 706/52; 706/45; 703/2
(58) Field of Classification Search .................... 706/45, 706/52; 703/2
See application file for complete search history.

(56) References Cited

U.S. PATENT DOCUMENTS

| | | | |
|---|---|---|---|
| 4,874,963 A | 10/1989 | Alspector | |
| 5,383,120 A | 1/1995 | Zernik | |
| 5,444,819 A | 8/1995 | Negishi | |
| 5,461,699 A | 10/1995 | Arbabi et al. | |
| 5,589,622 A | 12/1996 | Gurr et al. | |
| 5,721,910 A | 2/1998 | Unger et al. | |
| 5,761,442 A | 6/1998 | Barr et al. | |
| 5,867,799 A | 2/1999 | Lang et al. | |
| 5,933,818 A | 8/1999 | Kasravi et al. | |
| 6,112,194 A | 8/2000 | Bigus | |
| 6,128,587 A * | 10/2000 | Sjolander | ........................ 703/2 |
| 6,300,957 B1 | 10/2001 | Rao et al. | |
| 6,377,259 B1 | 4/2002 | Tenev et al. | |
| 6,411,962 B1 | 6/2002 | Kupiec | |
| 6,463,433 B1 | 10/2002 | Baclawski | |
| 6,529,603 B1 | 3/2003 | Palmer | |
| 6,578,022 B1 | 6/2003 | Foulger et al. | |
| 6,611,841 B1 | 8/2003 | Han | |
| 6,628,312 B1 | 9/2003 | Rao et al. | |
| 6,654,761 B2 | 11/2003 | Tenev et al. | |

(Continued)

FOREIGN PATENT DOCUMENTS

EP         1 107 157 A2    6/2001

OTHER PUBLICATIONS

Kolter et al, Dynamic Weighted Majority: A New Ensemble Method for Tracking Concept Drift, Proceedings of the Third IEEE Conference on data mining, pp. 123-130.*

(Continued)

*Primary Examiner*—Wilbert L Starks, Jr.
(74) *Attorney, Agent, or Firm*—Paul, Hastings, Janofsky & Walker LLP (57) ABSTRACT

A predictive architecture system and method that supports predicting likely future evolutions by aggregating and analyzing large amounts of data. The invented system includes a multi-level architecture, along with one or more feedback functions that drive search and discovery for information in support of a "hypothesis" or discovery of significant information in advance of clear hypothesis formation and passing on higher-level predictive support or lack of support for existing and/or new hypotheses.

21 Claims, 4 Drawing Sheets

U.S. PATENT DOCUMENTS

| | | |
|---|---|---|
| 6,665,681 B1 | 12/2003 | Vogel |
| 6,668,256 B1 | 12/2003 | Lynch |
| 6,978,274 B1 | 12/2005 | Gallivan et al. |
| 2002/0007373 A1 | 1/2002 | Blair et al. |
| 2003/0014428 A1 | 1/2003 | Mascarenhas |
| 2003/0128998 A1 | 7/2003 | Nishi |
| 2003/0163302 A1 | 8/2003 | Yin |
| 2003/0212675 A1 | 11/2003 | Denesuk et al. |
| 2003/0220860 A1 | 11/2003 | Heytens et al. |
| 2004/0172378 A1 | 9/2004 | Shanahan et al. |
| 2005/0071328 A1 | 3/2005 | Lawrence |
| 2005/0149494 A1 | 7/2005 | Lindh et al. |
| 2005/0222989 A1 | 10/2005 | Haveliwala et al. |

OTHER PUBLICATIONS

Carpenter, Default ARTMAP, CAS/CNS, Technical Report TR-2003-008, pp. 1-6.*

U.S. Appl. No. 10/877,776, filed Jun. 2004, Haveliwala et al.

Inxight White Paper by Catherine van Zuyen: From Documents to Information: A New Model for Information Retrieval, Inxight Software, Inc., Oct. 2004, (18 pages).

Inxight White Paper: Inxight SmartDiscovery: Discover the True Value of Information, Inxight Software, Inc., Jun. 2003, (13 pages).

Inxight White Paper: Inxight SmartDiscovery Product Data Sheet: The Complete Solution for Enterprise Information Discovery, Inxight Software, Inc., (4 pages).

Zhang, Byoung-Tak et al., "Personalized Web-Document Filtering Using Reinforcement Learning", Applied Artificial Intelligence, 2001, 17 pages.

* cited by examiner

SYSTEM AND METHOD FOR PREDICTIVE ANALYSIS AND PREDICTIVE ANALYSIS MARKUP LANGUAGE

CROSS-REFERENCE TO RELATED PATENT APPLICATIONS

The present application claims priority to and the benefit of U.S. Provisional Patent Application Ser. No. 60/623,868. The foregoing is incorporated by reference in its entirety.

BACKGROUND

The present invention relates generally to the field of predictive analysis ("PA"). Specifically, the present invention relates to a predictive architecture system and method for predicting likely future evolutions by aggregating and analyzing large amounts of data.

Predictive analysis capabilities are those that support an analyst's or organization's ability to generate hypotheses and create forward-looking predictions at both the strategic and tactical levels of analysis. The realm of predictive analysis requires a set of capabilities that go beyond straightforward search, data mining, and knowledge extraction methods. This is because predictive analysis seeks to model how persons (either individuals or organizations) act over time to accomplish a desired goal.

Predictive Analytics is a term used for analytical methods, typically operating on either structured or streaming data, generating next-state estimations. These methods could range from state vector estimation (e.g., Kalman filtering) to trend analysis and other forecasting methods.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DESCRIPTION

Embodiments of the present invention will be described below with reference to the accompanying drawings. It should be understood that the following description is intended to describe exemplary embodiments of the invention, and not to limit the invention.

Predictive analysis has been used to refer to forecasting which path through a set of alternative options is the most likely choice for an actor or entity. It can also describe the evolution of a future scenario based on interactions between multiple actors or agents. A key feature uniting these two approaches is that every "step" through future scenario, in which multiple options are typically present for each step, is associated with a "utility" measuring the value of that step. The "most likely outcome(s)" are the one(s) where the resulting utility, aggregated over time, provides greatest benefit to the actors/agents. This is done by selecting the trajectory of future steps resulting in highest probable aggregated utility.

Figure 1:
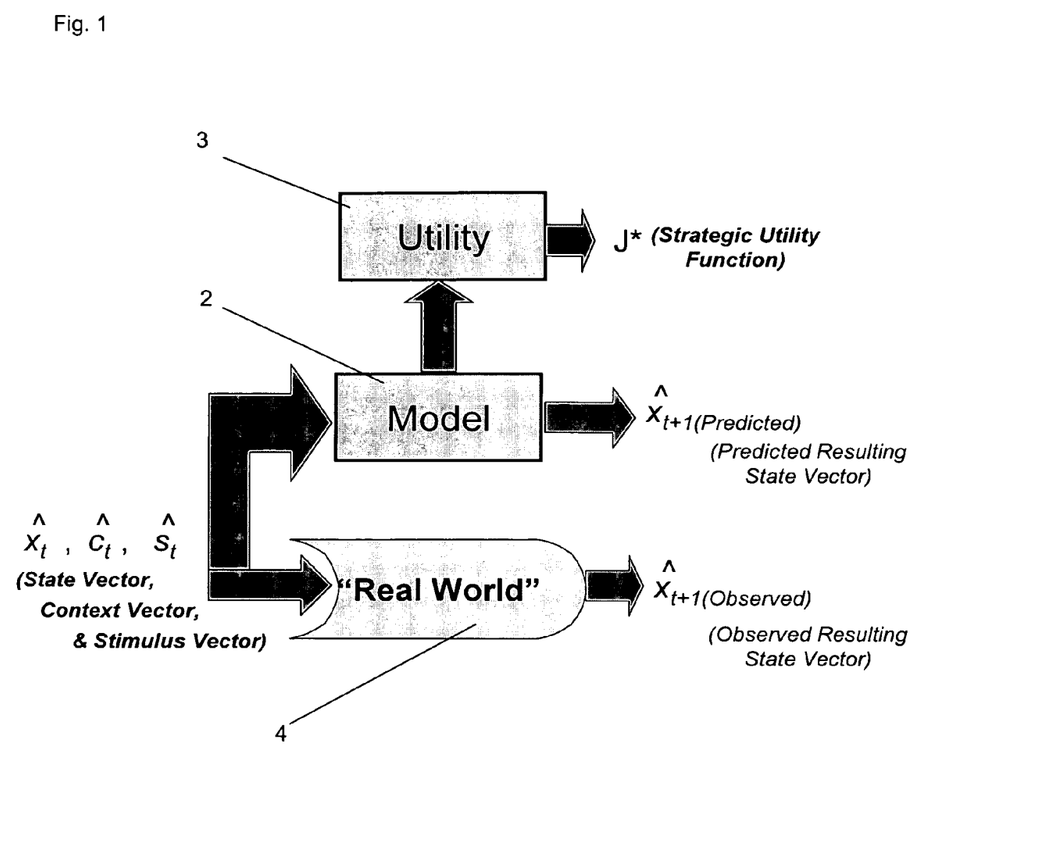
FIG. 1 is a block diagram of a simple predictive analysis system.

FIG. 1 illustrates the two major elements needed to perform basic low-level predictive analysis. First, a model 2 of time and space (or some other "landscape") of the possible sets of actions a person or entity could take is needed. Second, a utility function 3 is required. The utility function 3 represents that which the entity being modeled seeks to maximize over time. Finally, the outcomes of the above-described components may be compared to the real world 4 outcome.

A predictive analysis system must also have several ways of describing inputs and outputs. These may consist of a state vector $\hat{X}_t$ that represents the "real world" of the entity whose activities are to be predicted, a conditioning vector $\hat{y}_t$ that represents context, or the specifics of the environment in which the entity operates, and a stimulus vector $\hat{S}_t$ that represents the any specific actions outside the entity's immediate control, but which can influence the actions that the person will take.

To execute predictive analysis, knowledge is inputted into the model 2 about the current state of the subject person or entity, the specific environmental factors or context, and any significant stimuli. The model 2 computes the "next state" that will evolve. It does so by modeling not only the possible actions that can take place, but using the utility function 3, it identifies which set of actions will most satisfy the goals and desires of the person or entity being modeled. This is called "maximizing utility." Various other aspects of predictive analytics can enter into the model-based computation, e.g., trend calculations, anomaly detection, or examination of cluster relationships. However, these elements by themselves are not complete descriptions of how the modeling and simulation would perform for true, generalized predictive analysis.

Ideally, the utility function 3 is a real mathematical function that can be computed for different alternative courses-of-action (CoAs). An example of a basic utility function is the artificial intelligence programming used for simple computer chess software. Computer chess is used as an example because although numerous, there are a finite number of moves that can be calculated along with a corresponding utility for each one. However, in a worldview model, one of the biggest challenges in predictive analysis is to create and compute useful and accurate utility functions.

Finally, as shown in FIG. 1, the predictive analysis output includes a predicted and observed resulting state $(X_{t+1})$. In addition, a measure of the utility (J) that was achieved is calculated. Roughly, this measures how well an entity was able to achieve their overarching goals.

Predictive analysis has numerous applications in several different fields. For example, Sentia Group's Senturion embodies a group of methods related to modeling stakeholder interactions over time. The utility functions are explicitly defined. Users identify stakeholders, and characterize their interactions. Results are propagated through a set of future time-steps, typically leading to a specifiable future situation and/or dynamic. Another application of predictive analysis can be found in the process control realm. Specifically, predictive analysis systems may be used in conjunction with flight control or chemical process control systems.

Predictive analysis may also be used in intelligent game playing systems. Game-playing systems (e.g., for chess or "go") require specification of a playing field (game board), actors or agents (game pieces or stones), "allowed moves" and "possible interactions" (capture, check, etc.). In addition, there are specific utility functions associated with all specifiable levels of granularity for game description—from ranking specific pieces (e.g., a rook being worth more than a knight), to certain kinds of moves within certain pre-existing board configurations and at certain stages of the game. The specific and well-defined utility functions, along with multiple worked-in-detail tactical configurations, along with the computational power to generate a fully-worked-out set of future scenarios (e.g., up to eight or more moves in advance) has made for successful computer-based game-playing systems.

To accomplish a complete predictive analysis capability, preferably full-fledged predictive analysis includes more than a modeling and simulation function that allows forward projection over time of the events, actions, and relationships carried out by actors (objects) as defined in certain environments. This requires a substantial depth for not only object-oriented modeling but also modeling actions/relationships as well as temporal and geospatial context. Thus, a full predictive architecture system and method that supports predicting likely future events by aggregating and analyzing large amounts of data is provided.

Figure 2:
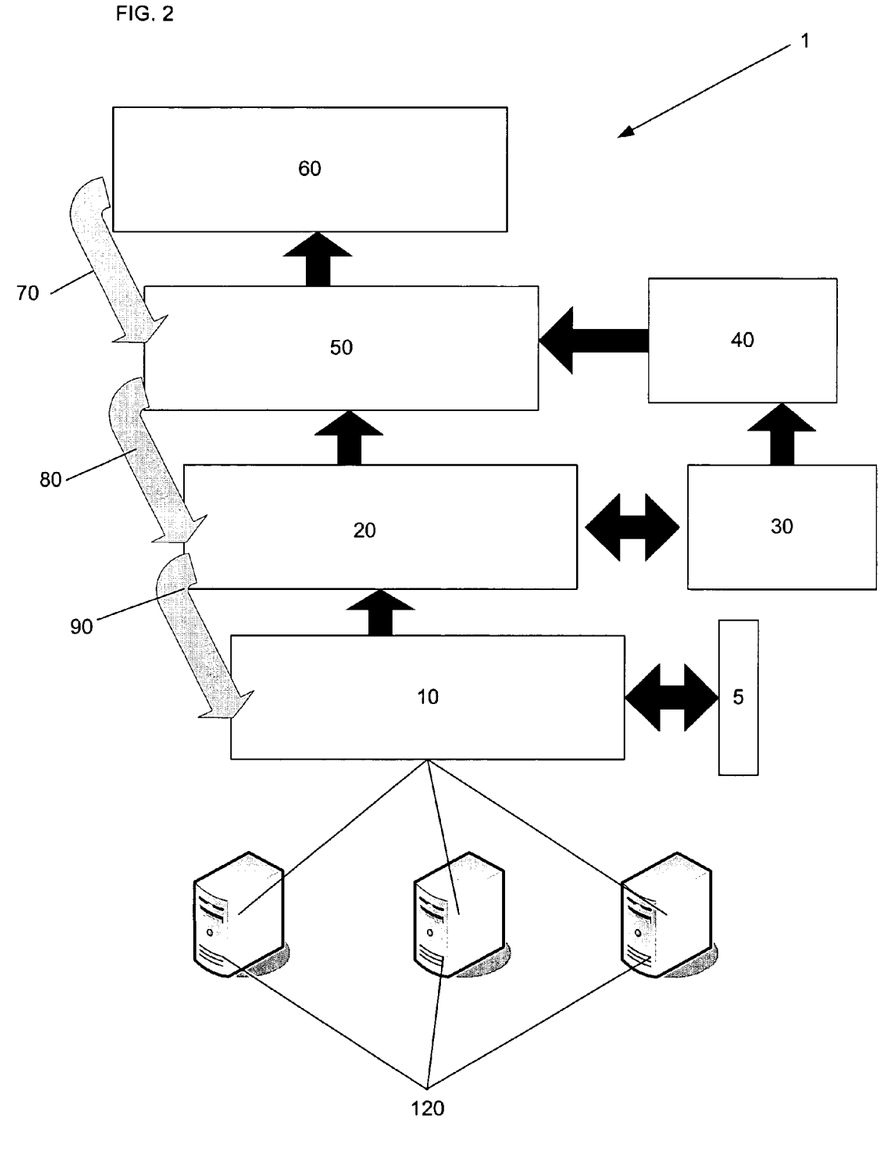
FIG. 2 is a block diagram of a predictive analysis architecture according to one embodiment of the invention.
Figure 3:
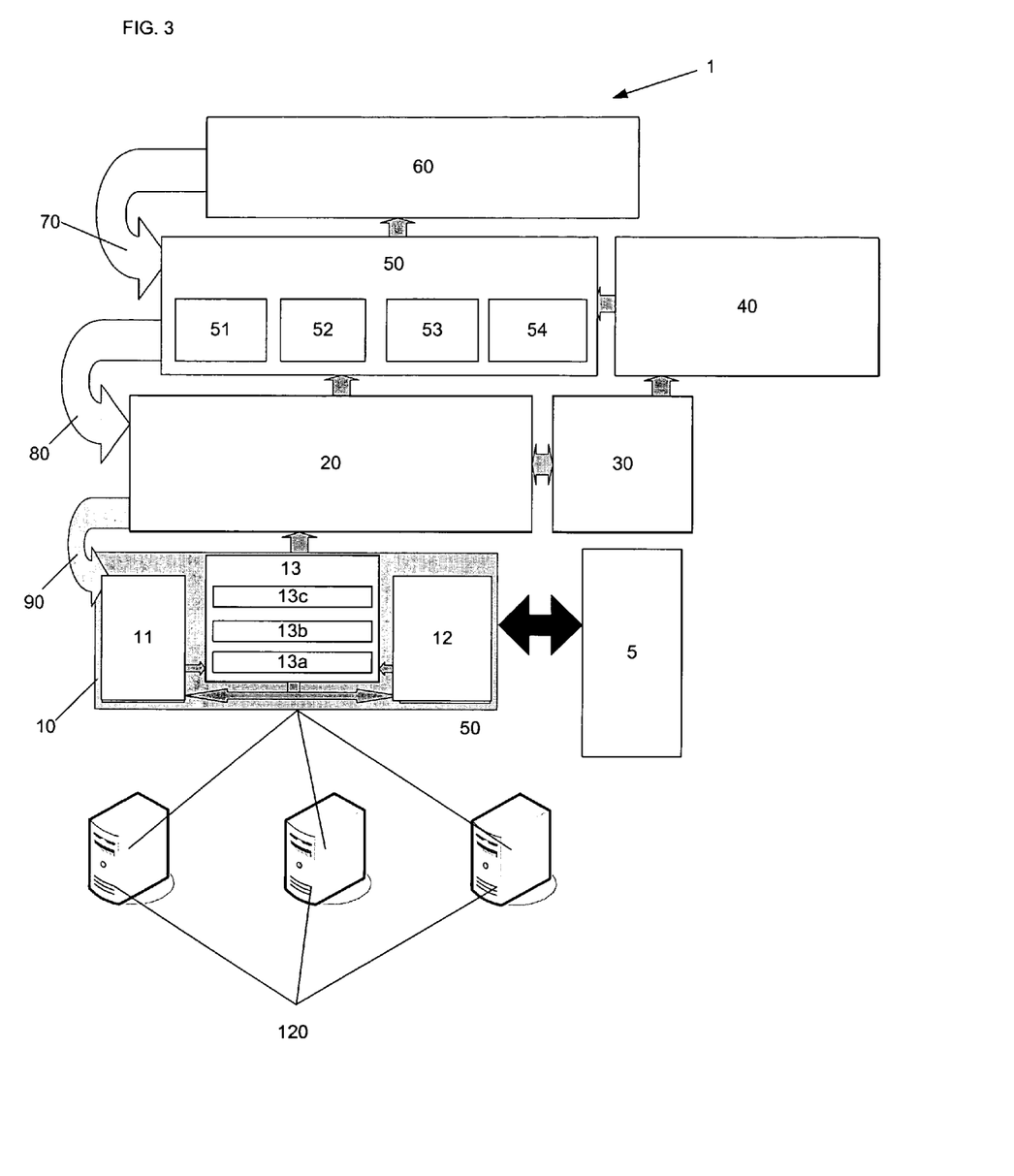
FIG. 3 is a block diagram of a predictive analysis architecture according to one embodiment of the invention.

An exemplary predictive analysis architecture 1 according to one embodiment of the invention is shown in FIGS. 2 and 3. A full predictive architecture (or predictive analysis architecture) 1 supports predicting likely future evolutions by aggregating and analyzing large amounts of data. The predictive architecture necessarily contains multiple major levels, each of which is a full processing subsystem. These levels include a knowledge discovery level/subsystem 10, which will itself contain one or more knowledge discovery subsystems, a hypothesis generation and validation level/subsystem 20 along with a set of world models 30,40, and a suite of predictive analysis support capabilities 50, including modeling and simulation 51, the ability to generate and modify various utility functions 52, a scenario walk-through capability 53, and a learning/generalization capability 55 that can associate learned cumulative utility function values with initial steps in various walk-through trajectories. Further, the predictive architecture 1 enables a suite of advanced predictive methods 60 that take into account the occurrence of state transitions, which can be triggered by one or more sequences of events.

According to one embodiment of the invention, predictives are the output of a predictive analysis architecture 1 and process that gives specific, quantifiable information regarding one or more potential future scenarios. The predictives can include likelihood/plausibility factors, and also other metrics and more model-dependent parameters. The predictives, along with the models generating these predictives, are the most critical need in performing predictive analysis, especially for situations that can undergo state-breaking transitions due to non-linear phenomena. According to one embodiment of the invention, the functional role of predictives is to anticipate transition plausibility.

If predictive analysis could be done solely using a model-and-simulation approach, coupled with actors behaving in accordance with their unique utility functions, there would not be an exceptionally strong need to embed the predictive. analysis function within a full predictive analysis architecture. However, the behaviors for which predictive analysis are most desired to anticipate are those where numerous entities can respond to a given situation; it is not simply a matter of a well-defined set of actors carrying out interactions in accordance with their unique interaction profiles and utility functions.

It is the environment or milieu encompassing the entire situation in which predictions are desired that necessitates a full predictive analysis architecture 1. Such an architecture, shown in FIGS. 2 and 3 enables the knowledge discovery subsystem 10 to perform knowledge discovery across a wide range of information sources 120, leading to information about the activities of entities (which will later be recast as domains), and also information about the communications between entities. This predictive architecture 1 will also make possible characterization of the global environment impacting the entities. These environmental factors can be modeled as either stimulus or gradients, depending on their uniqueness and severity.

The predictive architecture 1 uses a range of data sources and types 120 as inputs to the predictive process. This data may range from streaming, real-time data to warehoused data of multiple data types, e.g., structured and unstructured text (including audio which may be subjected to speech-to-text conversion), images, video, as well as various forms of "structured data" typically stored in one or more databases. The challenges of data organization and access, as well as appropriate metatagging and cross-correlation, are all well known to practitioners of the art and need not be addressed for this invention.

According to one embodiment of the invention, a Predictive Analysis Markup Language (PAML) is used to associate and organize the data. Markup languages are a means of associating metadata (data about data) and metaknowledge (knowledge about knowledge) with some source element, typically a document or text-based element. The purpose of a markup language is to make it easy for a computer-based system to rapidly, automatically, and consistently perform operations on a source element without having to "read" the document directly, because the relevant information is captured in the metadata/metaknowledge.

Thus, the role of PAML is to enable consistent processes to be applied—throughout the entire hierarchy of processes available in the predictive analysis architecture 1. The end result is consistent, high quality, automated performance of tasks involving large amounts of data, especially where the data is from different sources and/or in different formats, or possesses different attributes or characteristics.

In the context of predictive analysis, the first task is to identify what the various processes are that can and/or should be invoked. The second task is to identify the various forms of data that can be accessed and used, and third, the relationship between data and process is identified, because the various processes can invoke and use data in different ways, to suit different parts of the predictive endeavor.

According to one embodiment of the invention, the PAML defines the world view of the entity who is the subject of predictive analysis through specifying several contextual factors. For example purposes only, these factors may include ethnicity, religion, sex, age, etc. PAML also defines an entity's values, goals and objectives. As shown in FIGS. 2 and 3, once a taxonomy and/or ontology is defined, a PAML modeling processor 5 "marks-up" data elements for use with the predictive analysis system 1. These marked up data elements are used by all levels of the predictive analysis system 1, beginning with knowledge discovery.

According to one embodiment of the invention, the knowledge discovery level/subsystem 10 may be implemented using one of several COTS tools for knowledge discovery. Preferably, knowledge discovery is implemented using a processor configured to process a set of structured data and/or semi-structured data and/or unstructured data elements. According to another embodiment of the invention, an exemplary knowledge discovery system as disclosed in U.S. patent application Ser. No. 11/059643, herein incorporated by reference in its entirety, is used to provide functionality for the knowledge discovery level 10.

According to one embodiment of the invention, a full or partial knowledge discovery (KD) architecture 10 may be used. Such a KD subsystem 10 will operate on one or more data sources to produce "infons," or information (primitive) elements. These infons each describe a situation, and can be represented in a structured form, and will typically contain one or more concepts, together with one or more relationships between these concepts (one relationship being more typical for a given infon), along with time/space localizers and/or contextual and/or taxonomic identifiers. An infon may also contain notation that it is being reported or observed by an entity, so that what is contained is a representation of a specific entity's observations.

The KD subsystem 10 may also be used to produce "infon fragments," such as are produced by the various levels of the KD architecture. (E.g., "Level 1" produces concepts only, "Level 2" can produce a pair of concepts related by proximity in the data source, "Level 3" can produce a full syntactic decomposition of the items represented as an infon. "Level 4" provides context, and "Level 5" provides taxonomies, which allow the "Level 1" concepts to be related to multiple worldviews.) The infons and/or partial infons generated by the KD processes applied to unstructured data sources will be passed to the Hypothesis Generation and Validation component 20 of the Predictive Architecture 1.

As shown in FIG. 3, the KD layer 10 comprises several sub systems. These subsystems include a module for performing linguistic and image knowledge discovery 11, a module for performing geospatial knowledge discovery 12 and a extraction module 13. The extraction module 13 is capable of performing simple entity extraction 13a, simple event extraction 13b as well as complex event extraction 13c processes.

In addition, or as an alternative to, infon or partial infon extraction from a KD architecture 10, such an architecture can also yield analytic information, where various analytic methods are applied to structured data sources. When processes in the KD subsystem 10 are used to extract entities (specific persons, places, and/or things) in the course of generating infons and/or partial infons, these entities may act as "pointers" to various structured data sources, and the KD architecture reasoning and control capabilities ("Levels 6 and 7") may direct analytic processes (e.g., link analysis) to be performed as triggered by extracted entities. This would generate analytic results that can be fed into the Hypothesis Generation and Validation component 20 of the Predictive Architecture 1.

A hypothesis generator and validation component 20 is shown in FIGS. 2 and 3. The hypothesis generator and validation component 20 receives input from the knowledge discovery level 10. According to one embodiment of the invention, the role of the hypothesis generation and validation component 20 of the architecture 1 will be to take the separate reports generated on any one or set of events, and to characterize them as either the same (repeated) report on the same event, different reports (with potentially some differences in information content) on the same event, or reports on different events. This is critical in computing inputs to the various predictives. According to one embodiment of the invention, the hypothesis generator 20 is implemented using known COTS tools. Preferably, the hypothesis generator 20 is implemented as disclosed in U.S. Provisional Patent Application No. 60/712445, herein incorporated by reference in its entirety.

This component enables a methodology for generating hypotheses, at various levels of complexity, based on the infons extracted within the KD component 10 and "pushed forward" to the Hypothesis Generation and Validation (HGV) subsystem 20. As stated above, the role of KD is to identify those data elements from large corpora where there are concepts, and potentially entities, of interest. The role of ontologies and taxonomies is to provide a framework by which context-determination methods (as Level 4 processes of a KD system) can yield the "clues" on which the evidential reasoning methods will operate. The role of evidential reasoning is to both aggregate evidence in support of a given assertion (hypothesis verification), and also to identify conflict between evidence items, which could yield a lower valuation on an initially proposed hypothesis.

The first step in HGV is to assert that an entity found and/or extracted during the KD process matches a known, reference entity, or defines a new entity that has previously been unknown. Once an initial "identity" hypothesis has been formed, for one or more entities that are either referenced as known entities or who appear as new entities, then the relationships and other attributes specified by the infon containing these entities can be matched against any similar, "reference infons." For example, in a meeting or interaction between two heads of state, the objective would be to determine if the data source was describing a meeting that had already been known to occur and was largely documented as a "reference event," or if this was new information.

Thus, the HGV component 20 allows for the following capabilities. Evidence accumulation should be traceable. Both uncertainty and conflict in potential decisions/assignments should be represented explicitly. There should be a defined means for accumulating additional evidence to support potential assertions, so that a "minimal-cost" set of rules for obtaining evidence can be applied (assuming that each "evidence unit" carries an associated cost), and there should be a means to cut-off further evidence accrual after sufficient evidence has been obtained to support a given assertion, while the uncertainty and/or conflict about this assertion are within acceptable and defined limits.

According to one embodiment of the invention, a preferred method for implementing the HGV component is to use Dempster-Shafer reasoning, which provide a means of evidence aggregation within the overall decision-support architecture. This allows for explicit pairwise combination of "beliefs," including measures of uncertainty and disbelief in a given assertion. It will also be possible to specify in advance how much a given additional form of evidence will be allowed to contribute to the total belief. This means that cost/benefit tradeoffs for collecting different forms of evidence from different sources can be assessed, leading to a rules set governing evidence-gathering.

Further, as shown in FIGS. 2 and 3 a feedback controller 90 is operatively coupled from the hypothesis generator 20 to the knowledge discovery subsystem 10 for automatically providing supporting information to the knowledge discovery subsystem 10 based on the characterized filtered set of information or infons.

As shown in FIG. 2, the predictive analysis architecture 1 also includes a set of specific world models 30 and a set of contextual world models 40. Specific world models 30 include but are not limited to scenarios and situations, events and entities. As shown in FIGS. 2 and 3, the hypothesis generation and validation component 20 accesses the specific world models 30 to generate and validate information. According to one embodiment of the invention, the contextual world model layer 40 may include models for stakeholder interactions, geopolitical/economical models, climate models and geospatial or environmental models. According to one embodiment of the invention, the role of the various specific world model layers 30 will be to provide inputs towards the "layer" or model in which the predictives are being computed. For example, a world layer 30 modeling crop productions or hurricane forecasts can be an input to an economic and/or political layer, which could be the layer in which future scenarios are being predicted.

A suite or system of predictive analysis support capabilities 50 is shown in FIGS. 2 and 3. The suite 50 has access to the output of the hypothesis and validation layer 20 and various contextual world models 40. According to one embodiment of the invention the predictive analysis subsystem 50 possess a model/scenario simulator 51. A basic predictive analysis subsystem 50 will also be in possession of various utility functions 52.

The predictive analysis system 50 will also possess a "walkthrough" capability 53. At each step in the walkthrough a utility function or functions will be aggregated according to a predefined aggregation function. Finally, the predictive analysis system 50 will possess a mechanism capable of synthesizing predictive out put 54. Specific functions of this capability may include but are not limited to learning, generalization and developing associations. In addition, there must be a means to go through the "walkthrough" process for sufficient variants and for a sufficient time into the future that guarantees, with some level of confidence, that the next step selected will be one resulting in highest future aggregated utility. The predictive analysis support system 50 generates output in the form of weighted course-of-action predictions. As shown in FIGS. 2 and 3 this output is fed to an advanced predictive layer 60.

The advanced predictive layer 60 receives input from the predictive analysis support system 50 and via feedback mechanism 70 provides advanced input to the predictive analysis support system 50. The primary function of the advanced predictive layer 60 is to apply nonlinear gradients to the weighted course-of-action predictions generated by the predictive analysis support system 50

A series of feedback functions 70, 80, 90 are shown in FIGS. 2 and 3. The feedback functions drive important tasks such as search and discovery for supporting information, typically in support of a "hypothesis" or even a discovery of some potentially significant information, in advance of clear hypothesis formation, and passing on higher-level predictive support of or lack of support for existing and/or new hypotheses.

Much work in predictive analysis deals with entities and their interactions, or events and their potential impacts, as though these entities/events were all "equal" in some manner. By way of analogy, this is similar to many classification methods, where each of the possible "classes" to which an observation or entity could be assigned are "equivalent" to each other in that there is no taxonomy of classes, nor a hierarchical classification system. (This would be the case, for example, in having a classifier that had to classify handwritten or "noisy" letters of the alphabet into one of 26 possible, conceptually equivalent "classes.")

Instead, according to one embodiment of the invention, it is very reasonable that in many predictive scenarios, there are those entities whose interactions must be modeled in detail, and those whose behaviors and intentions can be modeled as more of a group behavior. The question then becomes one of identifying the entities that will be expressly modeled, and those whose interactions with, influence on, and influence by, these entities can be modeled at a more general and/or global level.

For sake of exposition clarity, this discussion is cast in terms of predicting outcomes between large interacting sets of stakeholders. An example application area would be world politics, where the stakeholders are individuals, organizations/agencies, component parts of a national or other government, groups of persons sharing a common religious, ethnic, or national identity, up to the level of entire nations and world regions. Existing methods already allow for different "kinds" of stakeholders to be modeled within a single predictive analysis system.

According to one embodiment of the invention, even with this diverse identification of possible stakeholders, there is yet another level of granularity to be exploited within the predictive analysis arena. This is done, once again, by analogy to a classification taxonomy. Thus, a "taxonomy" of predictable/predicted events (or occurrences, or state evolutions) is constructed such that there are multiple levels of granularity in the representation of these events. This allows feed forward ("feed-up") and feedback ("feed-down") interactions between events.

By analogy, this would be akin to modeling an election process by modeling the national voting at a high level, then regions, states, and subordinate divisions (e.g., precincts) at successively detailed granular levels in a taxonomic hierarchy.

According to one embodiment of the invention, lower levels of detail can be abstracted out when computing the more "aggregate" (higher in the taxonomy) predictions, which can typically be based largely on predictions of events/outcomes in the immediately supporting taxonomic level. (E.g., national results can be largely predicted based on regional results, etc.) There are two specific supporting advantages with this approach. First, this allows for linear and nonlinear weighting of component contributions, including component interactions. Second, this allows for differential and specific application of gradients and other "field effects" at lower levels, instead of having to model them across the entire top level, which could possibly not allow sufficient detail. For example, in forecasting national elections, different issues have different import in different regions; e.g., health care and social security issues can carry somewhat more impact in regions dominated by an older population demographic profile. For example, according to one embodiment of the invention, a social security gradient may be selectively applied to a region having a large senior citizen population to effectively predict outcomes in that region.

According to one embodiment of the invention, one important use of granular representations is in performing predictive analysis along "boundary areas." A boundary area can be a physical boundary, e.g. a marsh, bay, or everglades area, where salt water and land meet. It can be a geophysical boundary, e.g., the border between two nations. It can be a "soft" boundary; e.g., an area between two tribes or ethnicities, or the area where troops from one country are dispersed among the populace of a second country.

According to one embodiment of the invention, to perform effective predictive analysis, boundary areas are characterized with a higher granularity than areas that are largely self-consistent. This is why, for example, cities with multiple demographic profiles must be modeled with greater granularity for election forecasting purposes than wide swathes of country in the upper Mid-West.

According to one embodiment of the invention, as shown in FIG. 2 the weighted course-of-action information generated by the predictive analysis support system 50 is fed to an advanced predictive methods layer 60. The advanced predictive methods layer 60 applies various non-linear gradients to the weighted course-of-action information generated by the predictive analysis processor 50. These non-linear gradients may be known as "state-breaking" predictions or as "regimeshifting" or "massively nonlinear" behavior. The preferred terms for these concepts are phase transitions and emergent behaviors. According to one embodiment of the invention, using these concepts, the present invention may determine when or under what conditions a set of interacting entities will evolve in their interactions into an interaction modality that is substantively different than the one prior to the interactions characterizing the pre-transition state. A description of the various types of non-linear gradients follows.

There are three generic types of state-breaking predictive scenarios each of which requires a different predictive method. Simple phase transitions are characterized predominantly by short-term and/or local interactions between system elements. Complex phase transitions (including bifurcations), where the system elements have both short-and long-range/long-term interactions (e.g., modeled by order parameters), along with possible hysteresis in local element state persistence, and hyper-complex phase transitions, in which there are not only short and long-range interactions, but also specific, "learned" linkages and sustained "communications" between system elements, leading to much more complex system behaviors.

For example, suppose that a predictive model was used to gauge how social interactions would evolve in a community during the course of a natural disaster. Stakeholders could include the state governor, the city mayor, members of the city council, the chief of police, the local Red Cross leader, and many others. Up to a point, interactions could be characterized in a specifiable manner that might be dependent on external forces (e.g., severity of the disaster), but not remarkably—that is, not showing a mathematical function discontinuity—as the situation severity evolves. At a certain point, though, the situation could become so severe that all "normal" interactions break down. When this happens, new stakeholders and new interaction modes could come into the situation. New stakeholders could include the commander from an assigned unit of the National Guard. A new set of "interaction profiles" could include martial law and penalties to those who do not conform to the new martial law requirements.

The above example illustrates a "phase transition" in a social situation. It is assumed that in state-breaking models, there are often changes in stakeholders and the kinds of allowable interactions. There are several characteristics unique to state-breaking phase transitions. For example, according to one embodiment of the invention, the utility functions 52 providing the value obtained with each different interaction are very likely to change when the "state," or overall governing paradigm for interactions, changes. In short, different "values" may prevail. The change in utility functions 52 may be not only nonlinear; it may be discontinuous.

An aggregate of similar or related phenomena, separated by "windows" of space and/or time (or separated in some quantifiable dimensions) can collectively induce a state change that would not come about if they were to occur with more space/time/other-dimensional distance. For example, a small number of terrorist activities—whether geographically close or occurring across a nation—would require very substantial first responder, military, and area leadership responses. However, at a certain "threshold," there could be too many incidents for the infrastructure to absorb. This is a case where multiple activities—even if each is limited in scope and duration—can provoke a wide-scale, temporally persistent response that includes massive behavioral changes. For this reason, the granular approach identified in the previous section is not only necessary; it provides a representational framework within which to couch the next set of predictive model characterizations.

According to one embodiment of the invention, a system characterized by a collection of interacting entities operating within an open or closed environment, where input of some stimulus can cause system elements (either single, unique entities or collections of these entities that can be referred to as "domains") to shift from one state to another. The interactions between system elements are typically simple and based on neighbor-interactions; there are no "interactions-at-a-distance."

This description will be further built out using the concept of two states, state "A" and state "B," where state "B" is the more "active" state, and requires further energy or stimulus in order for a domain to be in this state.

In a statistically large system (one with sufficient domains so that the laws of statistical thermodynamics can roughly approximate state distributions in the different domains), there will naturally always be some domains in state "B," even if the "rest state" or "lower energy state" is state "A." As some external parameter is increased, it is possible for more and more domains to switch from state "A" to state "B." For example, according to one embodiment of the invention, the domains can be localized regions in a city, or cities and villages within a nation or state. The "lower energy state A" would be characterized by conditions of relative rest and peace; the "higher energy state B" would be a region characterized by civil strife, urban warfare, and/or various forms of unrest and/or insurgent actions.

Based on this example, then, the role of the predictive analysis architecture 1 is to determine if and when a city (composed of multiple localized regions), or a nation/state (composed of cities and villages) would transition from a situation where there was some strife and/or unrest, but at a relatively low level of activity, to a situation characterized by widespread and persistent strife, unrest, and disorder.

The kinds of external parameters that could cause a "build up" of system "energy," sufficient to cause a "phase transition" to a system-wide different mode of behavior would be factors affecting almost all system elements in a very similar manner. Examples include shortages of food or gasoline, fear regarding a widespread and pervasive threat (e.g., health threat), or other natural disaster (e.g., hurricane), and/or widespread and consistent rhetoric inducing a certain form of action against some "globally perceived" (i.e., impacting everyone) threat.

It is worth noting that these factors are those that do not greatly rely on local entity (or domain) interactions or coordination in order for a system-wide effect to appear. Rather, the individual entities (or domains) need only respond similarly to the "stimulus" that is provided to most or nearly all of the entities/domains.

According to one embodiment of the invention, the predictive is the increasing slope of the histogram of singular or observable behaviors characteristic of an entity's (or domain's) singular transition to the more active state. The value of hosting the predictive capability within the full predictive analysis architecture 1 is the ability to automatically extract and identify those reports of separate, singular incidences. Note that the hypothesis generation and validation capability provided by the hypothesis generation processor 20 plays a pivotal role in disambiguating reports of the same versus separate incidences. An immanent phase transition to a different state "B" can be estimated as the histogram slope approaches a singularity.

The second most complex set of phase transitions again occurs in a system characterized by a collection of interacting entities operating within an open or closed environment, where input of some stimulus can cause system elements (either single, unique entities or entity "domains") to shift from one state to another. The difference is that the interactions between system elements include both simple neighbor-interactions and more complex and subtle "interactions-at-a-distance." These latter are not subject to learning, but rather can be modeled at the statistical level through use of an order parameter.

Predictable activities can be tied to not only granularity and to interaction profiles that depend on aggregate forces and can undergo state changes, but there is an additional potential for self-stabilizing behavior. In analogy with certain phase transitions in both physical systems and in brain functioning, this can be described by an "order parameter" governing long-range interactions that persist well beyond what would be expected with any set of simple interactions with localized impacts (in terms of space, time, and other near-dimensional relationships). This is a capability that rests on the previously described capabilities in order to provide the modeling and simulation and feed forward utility environments for investigating the alternative future scenarios resulting from long-range interactions. It is this characteristic that leads to emergent behaviors; behaviors that would not be anticipated from any of the components previously described in the predictive analysis architecture.

A more complex model, embodying long-range order parameters, would be needed to predict a phase transition. Such models are well documented within the realm of physical chemistry.

The most complex form of phase transition takes place in a system composed of multiple communicating domains. For illustrative purposes only, each domain will be assumed to have two states. According to one embodiment of the invention, a domain for modeling and predictive purposes would be an entity or group of entities that interact closely with far more intra-domain connectivity than inter-domain connectivity, can be modeled as having a specific "domain state" with regard a given domain's interactions with other domains, so that while a given domain may have complex internal behaviors, it can be modeled as a bi-state (or multi-state) unit in terms of interactions with other domains, can potentially have hysteresis (or "metastable state persistence") in its domain activation or state, with regard to changes in surrounding conditions and/or inputs from other domains and interacts with both neighboring domains (according some dimension of "neighborliness," which may or may not be physical distance), and domains-at-a-distance (again according to some dimension set defining "distance").

Further, a domain for modeling and predictive purposes can have different sets of interaction "rules" governing interactions with neighboring domains vice interactions with domains-at-a-distance, can potentially have a learning rule describing interactions with neighboring domains, can have a different learning rule describing interactions with domains-at-a-distance, where the concept of a "learning rule" is largely drawn from neuronal modeling, and can potentially use the interactions with both neighboring domains and domains-at-a-distance to stabilize state persistence.

One of the most critical factors differentiating this kind of system from the previous one, even when order parameters are used to invoke interactions-at-a-distance, is that the "learned connections" between two domains (which can readily be domains-at-a-distance) can cause stabilization of a domain state well beyond what would normally be anticipated from either an initial or continued stimulus, even when the domains are individually able to show hysteresis in their state persistence.

The need for applying a model of this complexity is that when there are communications between elements ("domains") of the system, these communications can foster a transition to a more "disordered" state, and once the system has by-and-large made such a transition, then these inter-domain communications can cause such a "disordered" system state to persist much longer than would be otherwise anticipated, even when certain "pressures" to revert to the more normal, "ordered" state are applied.

Clearly, there would be a cost-advantage in being able to predict such a state transition in advance, so that influences to diminish the transition likelihood to a disordered state can be done proactively, thus saving much greater future cost.

Returning to description of domain transitions and inter-domain communications, the method employs a means for learned connections between domains that are active in a second, more high-energy state (state "B") at about the same time. This means that as certain domains transition from one state to another, e.g. from state "A" to state "B," a given domain that becomes active in state "B" can learn (e.g., via Hebbian or other learning rule) that other domains are also in state "B." The learning rule allows them to develop an inter-domain stimulus that they generate for each other, assisting state persistence. Once a given domain becomes persistently active in state "B," it is capable of inducing neighboring domains to become active in that state also. In this sense, each persistently active domain can become a "nucleus" seeding an outgrowing cluster of domains active in the state "B." With multiple domains interacting-at-a-distance to stabilize each other as nuclei, there is a basis for promoting a state transition across a large number of the remaining domains.

The above-described system is the system for which it is most difficult to form good predictives, for two reasons. First, it is possible, given a strong degree of interaction-at-a-distance coupling, for a system to transition very rapidly from state "A" to state "B" given sufficient stimulus and sufficient communications density. Second, the counter to rapid, full-system state transition is that as inter-domain communications increase, all forms of "communications" are enhanced. Thus, there is as likely to be "negative stimulus" as well as "positive stimulus" that would encourage the phase transition. This means that random, small stimuli that "took attention away" from a single, strong phase-inducing stimulus could cancel out a potential phase transition. At the same time, minor perturbations can also accelerate the effect of a relatively small stimulus, causing an unanticipated phase transition.

Overall, this is the most complex modeling and prediction scenario. Predictives are not only the overall "histogram" of activities, but also increases in communications between specific entities as they respond to a given stimulus. This indicates a learning stage, which is a precursor to rapid system phase transition when even a moderate sustained stimulus presents itself, when accompanied by a sufficient density of "positive" rather than "negative" random stimuli. The impact of small random stimuli (i.e., perturbations), depending on their nature and temporal coincidence with a strong input stimulus, can either diminish or accelerate a potential phase transition.

Figure 4:
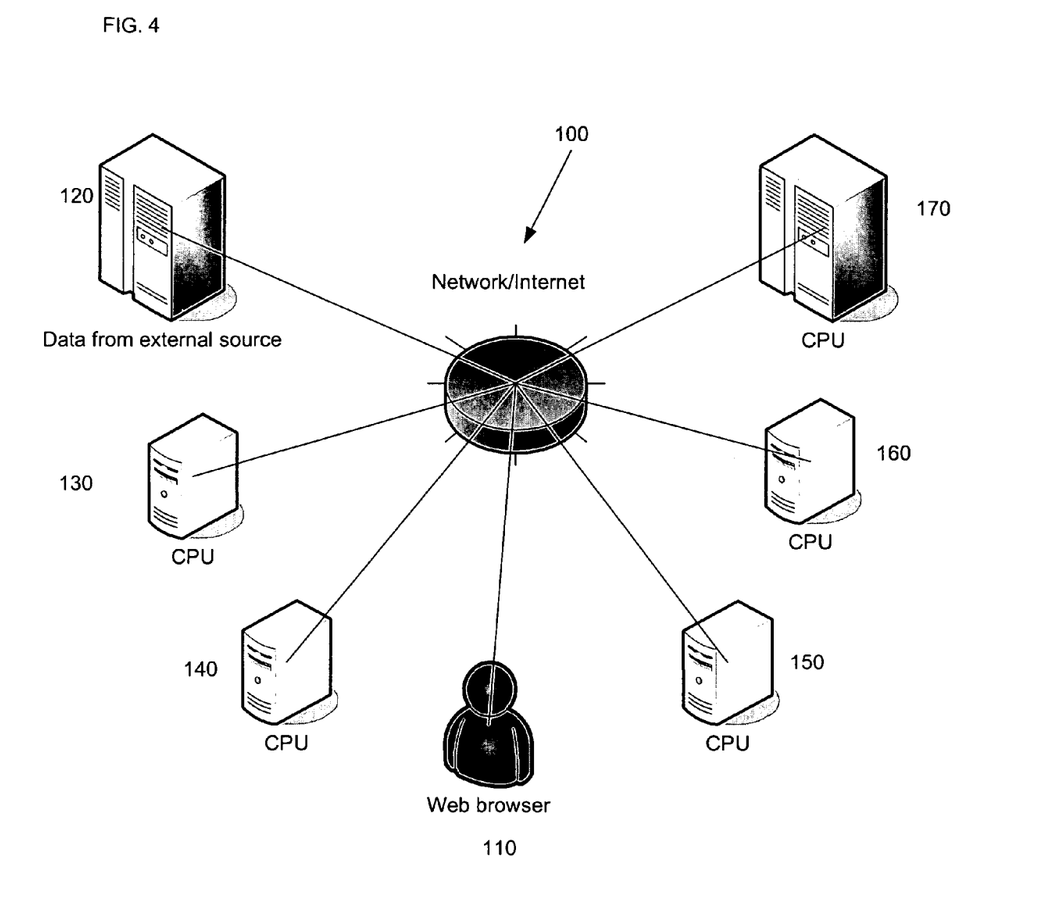
FIG. 4 is a block diagram of the predictive analysis architecture implemented on a physical computer network according to one embodiment of the present invention.

FIG. 4 is a hardware architecture 100 for implementing the predictive analysis architecture 1 according to one embodiment of the present invention. It should be noted that each system and subsystem of the predictive analysis architecture 1 may be physically implemented with one or more processing modules. A user system, device or mechanism 110 such as, for example, a device having a web browser is operatively connected to a network 100 of CPU's. External data sources 120 are operatively connected to the network 100. A CPU 130 is operatively connected to the network 100. The CPU 130 is capable of performing all functions for performing knowledge discovery as described above. A CPU 140 is operatively connected to the network 100. The CPU 140 is capable of performing all functions related to hypothesis generation and validation as described above. A CPU 150 is operatively connected to the network 100. The CPU 150 is capable of performing all functions related to basic predictive analysis functionality. A CPU 160 is operatively connected to the network 100. The CPU 160 is capable of performing all functions for performing advanced predictive methods as described above such as computing state transitions. As shown in FIG. 4, a CPU 170 is operatively connected to the network 100. The CPU 170 houses al the specific world model 30 and contextual world model 40 functionality. The user device 110 may function as either an input or output device (or both) and may be configured to display the results of the predictive analysis system and method.

The foregoing description of a preferred embodiment of the invention has been presented for purposes of illustration and description. It is not intended to be exhaustive or to limit the invention to the precise form disclosed, and modifications and variations are possible in light of the above teaching or may be acquired from practice of the invention. The embodiment was chosen and described in order to explain the principles of the invention and as a practical application to enable one skilled in the art to utilize the invention in various embodiments and with various modification are suited to the particular use contemplated. It is intended that the scope of the invention be defined by the claims appended hereto and their equivalents.

What is claimed is:

1. A system for predictive analysis, comprising:
   a predictive analysis processor configured to receive a data input and to generate a plurality of weighted course-of-action predictions, wherein the predictive analysis processor is operatively coupled to a modeler for defining a contextual world model in which future scenarios may be predicted;
   a predictive analysis feedback processor, operatively coupled to the first predictive analysis processor and configured to receive the plurality of weighted course-of action predictions and automatically providing supporting information to the predictive analysis processor based on the application of a nonlinear gradient to the received weighted course-of-action predictions; and
   an output device configured to display the course of action predictions.

2. The system of claim 1, further comprising:
   a model and simulation processor configured to project events, actions and relationships carried out by an entity as defined in the contextual world model;
   wherein the predictive analysis processor further comprises a utility function for determining projected events of greatest value to the entity initiating the projected events;
   a scenario generation processor configured to simulate execution of each projected event, action and relationship and aggregating the utility function to each projected event, action and relationship; and
   a synthesis processor configured to identify efficient events, actions and relationships and creating a generalized function based on the simulated execution of each projected event, action and relationship.

3. The system of claim 2, wherein the model and simulation processor is configured to construct a taxonomy of future events such that there are multiple levels of granularity in the representation of these events.

4. The system of claim 1, wherein the modeler is configured to define any one of a number of contextual models including but not limited to stakeholder interaction, geopolitical interaction, economical interaction, climate interaction, geospatial interaction and environmental interaction.

5. The system of claim 1, wherein the predictive analysis feedback processor is configured to apply emergent behavior information as the nonlinear gradient.

6. The system of claim 1, wherein the predictive analysis feedback processor is configured to apply diverse scenario integration information as the nonlinear gradient.

7. The system of claim 1, wherein the predictive analysis feedback processor is configured to apply one or more accelerants and/or forcing functions as the nonlinear gradient.

8. A system for predictive analysis, comprising:
   a knowledge discovery processor configured to collect and transforming a set of structured data and/or semi-structured data and/or unstructured data elements into a filtered set of information;
   a markup language modeling processor configured to define a markup language consistent with a subject entity's ontology, wherein the markup language is applied to the filtered set of information;
   a hypothesis generator, operatively coupled to the knowledge discovery processor, configured to characterize the filtered set of information, wherein a first feedback controller is operatively coupled between the hypothesis generator and the knowledge discovery processor for automatically providing supporting information to the knowledge discovery processor based on the characterized filtered set of information;
   a predictive analysis processor, operatively coupled to the hypothesis generator, for generating a plurality of weighted course-of action predictions, wherein a second feedback controller is operatively coupled between the first predictive analysis processor and the hypothesis generator for automatically providing supporting information to the hypothesis generator based on the weighted course-of action predictions;
   a predictive analysis feedback processor, operatively coupled to the first predictive analysis processor, for receiving the plurality of weighted course-of action predictions and automatically providing supporting information to the predictive analysis processor based on the application of a nonlinear gradient to the received weighted course-of-action predictions.

9. The system of claim 8, further comprising:
   a first model processor configured to produce a contextual model in which the weighted course of action predictions are generated; and
   a second model processor configured to provide input to the first model processor in the form of a plurality of world models.

10. The system of claim 9, wherein the first model processor is configured to define any one of a number of contextual models including but not limited to stakeholder interaction, geopolitical interaction, economical interaction, climate interaction, geospatial interaction and environmental interaction.

11. The system of claim 8, wherein the knowledge discovery processor is configured to produce a filtered set of information about the activities of a plurality of entities and/or information about the communication between entities.

12. The system of claim 8, wherein the knowledge discovery processor is configured to produce a filtered set of information capable of being used to characterize a global environment that will impact an entity.

13. The system of claim 8, further comprising:
 a model and simulation processor configured to project events, actions and relationships carried out by an entity as defined in the contextual world model;
 wherein the predictive analysis processor further comprises a utility function for determining projected events of greatest value to the entity initiating the projected events;
 a scenario generation processor configured to simulate execution of each projected event, action and relationship and aggregating the utility function to each projected event, action and relationship; and
 a synthesis processor configured to learn efficient events, actions and relationships generating a creating a generalized function based on the simulated execution of each projected event, action and relationship.

14. The system of claim 8, wherein the predictive analysis feedback processor is configured to apply emergent behavior information as the nonlinear gradient.

15. The system of claim 8, the predictive analysis feedback processor is configured to apply diverse scenario integration information as the nonlinear gradient.

16. The system of claim 8, wherein the predictive analysis feedback processor is configured to apply one or more accelerants and/or forcing functions as the nonlinear gradient.

17. The method of claim 16, wherein the generating step further comprises:
 projecting events, actions and relationships carried out by an entity as defined in the contextual world model;
 determining projected events of greatest value to the entity initiating the projected events;
 simulating execution of each projected event, action and relationship and aggregating the utility function to each projected event, action and relationship; and
 learning efficient events, actions and relationships and creating a generalized learned function based on the simulated execution of each projected event, action and relationship.

18. The method of claim 16, wherein the nonlinear gradient is emergent behavior information.

19. The method of claim 16, wherein the nonlinear gradient is diverse scenario integration information.

20. The method of claim 16, wherein the nonlinear gradient is one or more accelerants and/or forcing functions.

21. A method for conducting predictive analysis, comprising the steps of:
 providing a data input to a processor;
 defining a contextual world model in which future scenarios may be predicted;
 generating a plurality of weighted course-of-action predictions;
 applying a non-linear gradient to the plurality of weighted course-of action predictions to generate supporting information; and
 regenerating a plurality of weighted course-of-action predictions using the supporting information;
 displaying the predictions on an output device.

\* \* \* \* \*